Re. 24182

Oct. 20, 1953 E. N. DINGLEY, JR 2,656,419

MAGNETIC TAPE RECORDER-REPRODUCER

Filed Aug. 16, 1951

Edward N. Dingley Jr.
Inventor

UNITED STATES PATENT OFFICE 2,656,419

MAGNETIC TAPE RECORDER-REPRODUCER

Edward N. Dingley, Jr., Arlington, Va.

Application August 16, 1951, Serial No. 242,117

9 Claims. (Cl. 179—100.2)

My invention relates broadly to equipment utilizing a magnetizable tape or wire as a storage medium for recording and reproducing complex electrical signals which are hereinafter called "The Program."

My invention relates chiefly to circuit arrangements and mechanical structures whereby undesirable effects arising from variations of the linear velocity of the storage medium (hereinafter called "tape") are eliminated or greatly reduced.

One object of my invention is to eliminate or greatly reduce the undesirable effect in the reproduced program which is termed "flutter" or "wow" by those skilled in the art.

Another object of my invention is to eliminate the difference between the average speed of the tape during recording and the average speed of the tape during reproduction in order that the program will be reproduced in the same time interval as was required during recording.

Another object of my invention is to provide means whereby the recorder may be synchronized to a motion-picture camera and means whereby the reproducer may be synchronized to a motion-picture projector whereby the program recorded during the photographing of an action will be reproduced in synchronism with the projection of the action.

Figure 1:
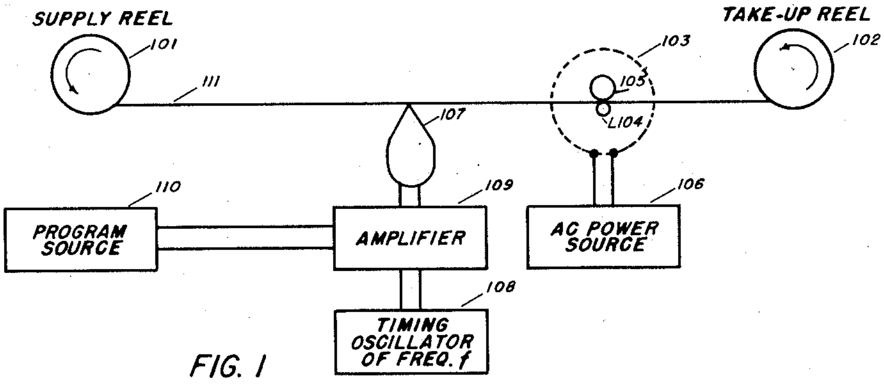

Other and further objects of my invention will be understood from the following specification and by reference to the accompanying drawings in which:

Figure 1 schematically represents the recording equipment.

Figure 2:
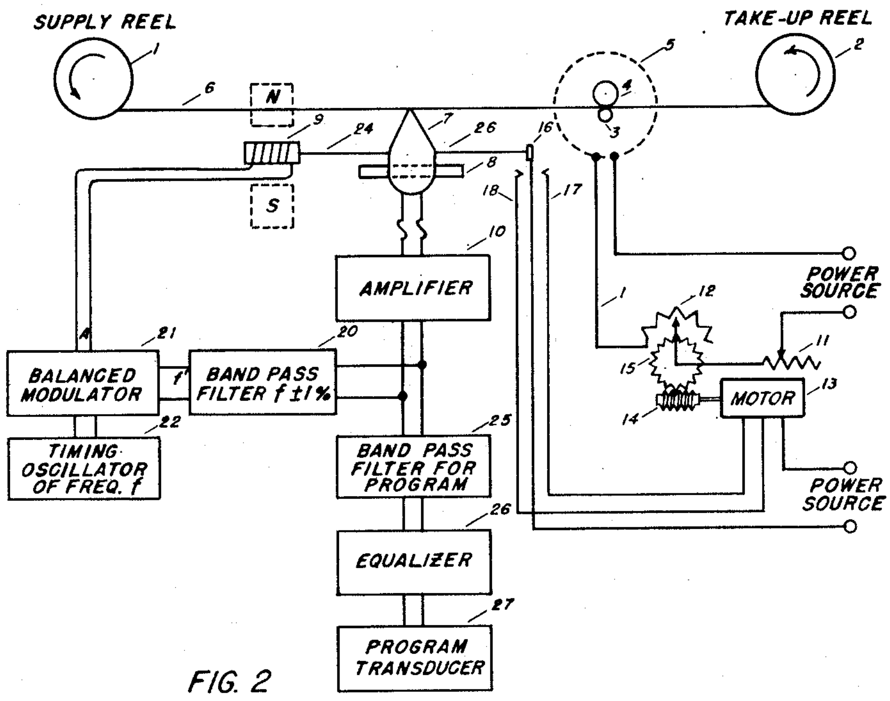

Figure 2 schematically represents the reproducing equipment.

Since this invention pertains chiefly to the transport system for controlling the velocity of the tape, I have omitted herefrom any description of the adjuncts to magnetic recorders such as provision for bias and erasure and other details well known to those skilled in the art but which have no bearing on this invention.

In Figure 1, the essentials of the tape transport system of magnetic recorders well known to the art are portrayed by: The supply reel 101 and the take-up reel 102 which may be driven by separate servo systems (not shown) to preserve constant tension in the tape 111; the tape drive motor 103 which drives the tape by means of the capstan 104 and the pressure idler 105; and the record-head 107 which is energized through the amplifier 109 from the program source 110. The synchronous capstan motor 103 is energized from a source 106 of A.-C. power. The portion of my invention which applies to the recorder consists of the addition of the timing oscillator 108, the output of which (having frequency *f*) is amplified by amplifier 109 and applied to the record-head 107 together with the signal from the program source 110. The major portion of my invention, as described hereinafter, concerns the utilization of the timing signals, thus recorded, in reducing or eliminating flutter and wow in the reproduced program.

In Figure 2, the essentials of the tape transport system of the magnetic reproducer are portrayed by: The supply reel 1 and the take-up reel 2 which are preferably driven by separate servo systems (not shown) to preserve constant tension in the tape 6; the tape drive motor 5 which drives the tape by means of the capstan 3 and the pressure idler 4; and the reproduce head 7 which is mounted in the guide racks 8 and which is capable of linear motion parallel to the travel of tape 6 under the influence of force exerted by the solenoid 9.

In Figure 2, the drive motor 5 may be a D.-C. motor or a series A.-C. motor, the speed of which is controlled by the manually operated rheostat 11 and by the vernier rheostat 12 which is positioned by the reversible motor 13 through the means of worm 14 and gear 15. The motor 13 is caused to rotate in a forward direction by the closure of spring contacts 16 and 18, and in a reverse direction by the closure of spring contacts 16 and 17.

The mode of operation of the magnetic reproducer equipment is as follows: During the starting operation, the magnetic tape 6 is accelerated by applying power to the capstan motor 5. As the tape 6 approaches normal velocity, the timing signal which was derived from oscillator 108 (Fig. 1) and recorded on the magnetic tape, will be reproduced by the reproduce head 7, amplified by the amplifier 10 and passed by the band-pass filter 20 when its frequency has increased to within 1% of frequency *f*, whereupon this timing signal (hereafter called *f'*) will be mixed in the balanced modulator 21 with a signal of frequency *f* derived from the timing oscillator 22. The resultant difference-frequency which appears at the output terminals A of the balanced modulator 21, is applied to the armature 9 of a solenoid which is provided with a permanent magnetic field designated as "N" and "S" in Figure 2. The armature 9 is rigidly connected to the reproduce-head 7 by means of the mechanical linkage 24.

The difference frequency applied to armature 9 causes said armature to start to vibrate, but the direction of motion of said armature during the first (or third) quarter-cycle of its vibratory motion is such as to move the reproduce-head 7 in a direction opposite to the motion of the tape 6. The resultant increase in the velocity of the tape 6 relative to the velocity of the reproduce-head 7 is such as to reduce the difference-frequency to nearly zero, or, stated in another way, such as to produce a phase difference $\phi$ between $f'$ and $f$ of some value between 90° (for which value the armature is not energized) and 180° for which value the armature 9 receives maximum value of direct current). The phase difference $\phi$ will tend to increase because, at the moment under consideration, the velocity of tape 6 is less than normal. As the phase difference $\phi$ tends to increase, the direct current in armature 9 also tends to increase, thus moving the reproduce head 7 further in a direction opposite to that of the tape motion and this motion tends to decrease the phase difference $\phi$. The phase difference $\phi$ at any instant will be that phase difference which produces sufficient direct current in armature 9 to hold the reproduce-head 7 in the proper position displaced from a normal position to which it tends to return through the action of suspension springs not shown.

A rigid mechanical linkage 26 connects the reproduce head 7 to contact spring 16. In consequence, the above described motion of the said reproduce-head causes spring 16 to make contact with spring 18, thus causing motor 13 to revolve in such a direction as to reduce the resistance of rheostat 12, thus causing an increase in the speed of capstan motor 5 and a consequent increase in the velocity of tape 6. The velocity of tape 6 continues to increase thus reducing the phase-difference $\phi$, thus reducing the current in armature 9, and thus permitting the reproduce-head 7 to return progressively toward its normal position through the action of its suspension springs not shown. When the reproduce-head 7 assumes its normal position, spring 16 is disengaged from spring 18, the motor 13 ceases to rotate and the average speed of capstan motor 5 and tape 6 remains approximately constant. Should the average speed of tape 6 be greater than normal, the average position of reproduce-head 7 will be off normal in the direction of tape motion, contacts 16 and 17 will close, and motor 13 will adjust rheostat 12 so as to reduce the average tape speed until contacts 16 and 17 are opened. Any short term variations, flutter or wow, which tend to appear in the frequency $f'$ due to irregularities in the tape velocity either during recording or reproduction, will tend to advance or retard the phase difference $\phi$ in proportion to the instantaneous time-position error of the signal storage medium relative to the reproduce-head 7. This immediately results in motion of the reproduce-head 7 in such a direction as to reduce the time-position error and the resulting phase difference $\phi$ to a minimum. In consequence, the variation of phase difference $\phi$ is held to a minimum. In further consequence, the rate-of-change ($d\phi/dt$) of the phase difference $\phi$ is held to a minimum. Since $d\phi/dt$ represents the instantaneous frequency difference between $f'$ and $f$, it follows that this frequency difference (flutter or wow) is held to a minimum. Since the frequency $f'$ and the various frequencies constituting the program are derived from the same magnetic tape, it follows that the flutter and wow in the reproduced program is held to a minimum. The reproduced program passes through the band-pass filter 25, which attenuates frequency $f'$, through the usual equalizer 26 and to the transducer or loudspeaker 27.

The technical literature contains descriptions of types of magnetic media recording-reproducing equipment which utilize the principle of recording a timing signal simultaneously with the recording of the program and which utilize the reproduced timing signal to apply instantaneous speed corrections to the capstan motor of the reproducer in an endeavor to maintain the correct media velocity from instant to instant. Although these types of equipment are capable of maintaining the correct average velocity of the media, they are incapable of reducing materially the short period variations in the instantaneous velocity of the media because of the excessive inertia of the rotor of the capstan motor. My invention not only maintains the correct average velocity of the media but also materially reduces the short period variations (flutter and wow) by providing a reproduce-head having small inertia and having the ability to move automatically parallel to the media in such a manner as to greatly reduce the effect of short period variations in the instantaneous velocity of the magnetic media.

Oscillator 108 of Figure 1 and oscillator 22 of Figure 2 may be highly stable oscillators having substantially identical average frequencies and having negligible short term frequency variations. Under these circumstances the maximum variation of the frequency $f'$ and the maximum flutter and wow of the program will not exceed the sum of the negligible short term variations of the two oscillators plus the maximum rate of change $d\phi/dt$ of the phase difference $\phi$. The later rate of change will be proportional to the difference between the time integral of the inadvertent accelerations of the tape, during recording and reproduction, and the time integral of the acceleration of the reproduce head 7 resulting from the force applied by the solenoid 9. Since the acceleration of the reproduce head is proportional to the applied force and inversely proportional to the mass of the head, it follows that the acceleration required to maintain negligibly small values of $d\phi/dt$ can be attained by means of a reasonably small force provided that the mass of the reproduce head is also small. Since $\phi$ is not permitted to vary by more than $\pi$ radians, the time required to reproduce the program will not differ from the time required to record the program by substantially more than 1/2 $f$ seconds.

The frequency $f$ of oscillator 108 of Figure 1 and of oscillator 22 of Figure 2 may be any desired frequency within the response capability of the equipment. It would be undesirable to select a frequency $f$ within the band of frequencies occupied by the program but such a frequency could be accommodated by obvious methods such as by providing additional filters or a separate timing track on the tape.

There is a certain advantage in selecting 60 C. P. S. as the frequency $f$ because it is less than the lowest frequency required for the reproduced program, because the 60 C. P. S. synchronous motor of a motion-picture camera can be energized from oscillator 108 and because the 60 C. P. S. synchronous motor of a motion-picture projector can be energized from the oscillator 22, thus assuring not only a very low flutter and wow in the reproduced program but also assuring the maintenance of exact synchronism between the audio program and the projected motion-picture action. It is possible to achieve the required synchronism by substituting the commercial 60 C. P. S. mains for oscillators 108 and 22 but in this case the percent wow and flutter is still equal to the sum of the percent short term frequency variations of sources 108 and 22 which, in the case of power mains, may be appreciable. The exact synchronism between the reproduced audio program and the projected motion-picture would be maintained because the synchronous motor of the projector is energized from the source 22. Should the average frequency of the source 22 be 1% higher than the average frequency of source 108, then the motion picture would be projected with 1% higher film speed and the audio program would be reproduced with all frequency components thereof increased by 1%, but these conditions would not materially degrade the quality of the program nor the picture.

There is a certain advantage in choosing the frequency $f$ of sources 108 and 22 to be greater than the highest frequency required for the program, say, 15 kc. This advantage lies in the fact that the resulting wavelength of the timing signal on the tape will be shorter than for a 60 C. P. S. timing signal. In consequence, a specified linear time-position error of the tape will result in a larger value of $\phi$, which will produce a larger correction current in solenoid 9, which latter phenomena will result in a "stiffer" or more accurate correction of flutter and wow. The disadvantage of choosing the frequency $f$ of oscillators 108 and 22 to be 15 kc. is that additional circuitry of a kind well known in the art, will be required to synchronize the synchronous 60 C. P. S. motors of the motion-picture camera and projector to the 250th sub-harmonic of the 15 kc. signal produced by oscillators 22 and 108.

In Figure 1 the A.-C. power source 106, which drives the capstan motor 103 of the recorder, may be the 60 cycle mains since variations, within reasonable limits, in the average and instantaneous speed of this motor, which would otherwise produce flutter or wow in the reproduced program, are eliminated or greatly reduced by the automatically controlled motion of the reproduce head of the reproducer.

In Figure 2 the latitude of motion of the reproduce-head 7 along its guides 8 should be sufficient to tolerate the maximum linear time-position error of the tape which is likely to occur due to time delays resulting from inertia in the rotors of motors 5 and 13. This maximum time-position error usually will not exceed plus or minus 0.1 inch.

It is preferable that the signals of frequency $f$ generated by timing oscillators 108 and 22 be approximately sinusoidal but other wave shapes may be utilized if desired. The balanced demodulator 21 and the solenoid 9 may be replaced by any of several combinations of devices, well known to the art, which will impart to reproduce-head 7, a motion which is substantially proportional to the phase difference $\phi$, or to the time-displacement existing between $f'$ and $f$ of Figure 2.

In Figure 2 the combination of the spring contacts 16, 17 and 18, the motor 13, the gears 14, 15, and the rheostat 12, comprises only one simple method of controlling the average speed of motor 5 and is portrayed to illustrate the principle of operation. There are several servo-control systems, well known to the art but unnecessarily complex for illustration herein, whereby the average speed of motor 5 may be increased or decreased in proportion to the linear displacement of the reproduce-head 7 from its normal center position.

In Figure 2 the straight-line mechanical linkages 24 and 26 are depicted solely for illustrative purposes. There are many mechanical linkage systems well known to those skilled in mechanical design which would serve to impart the motion of the electro-mechanical transducer (illustrated in Fig. 2 by solenoid 9) to the reproduce-head 7 and to the servo-control which is illustrated in Figure 2 by the contacts 16, 17, and 18. For example, it is sometimes desirable to impart rotary motion instead of linear motion to the reproduce-head 7 in order to control the instantaneous time position of the head 7 relative to the tape 6.

In Figure 2 the band-pass filters 20 and 25 may comprise any devices, well known to those skilled in the art, which are capable of effectively separating the reproduced timing signal from the reproduced program.

In certain applications it is desirable to reproduce the program at a rate different from the rate at which it was recorded. In practicing my invention, this may be accomplished by adjusting the average frequency of oscillator 22 to be different from that of oscillator 108.

If desired, a synchronous motor similar to motor 103 of Figure 1 may be mounted on the same shaft as motor 5 of Figure 2 and other similar adaptations may be made whereby the recording and reproducing functions may be accomplished by one equipment or assemblage.

What is claimed is:

1. A signal recording and reproducing apparatus comprising means for recording a complex electrical signal and a timing signal on a moving signal storage medium, moveable signal-reproducing means for reproducing the recorded complex electrical signal and the recorded timing signal, means for separating said reproduced signals, and means for utilizing the phase variations of the reproduced timing signal to position the said moveable signal-reproducing means including means to correct the average speed of the said moving signal-storage medium in such manner as to reduce or eliminate frequency variations in the said reproduced timing signal and to reduce or eliminate flutter and wow in the reproduced complex electrical signal.

2. A signal recording and reproducing apparatus comprising means for recording a complex electrical signal and a first timing signal on a moving signal storage medium, moveable signal-reproducing means for reproducing the recorded complex electrical signal and the first said timing signal, means for separating said reproduced signals, means for generating a control signal of magnitude proportional to a function of the phase difference between the reproduced first timing signal and a second timing signal, means responsive to said control signal for positioning said moveable signal-reproducing means to maintain a minimum phase-difference between the said reproduced first timing signal and the said second timing signal, and means responsive to a positioning other than normal of the moveable signal-reproducing means for adjusting the average speed of the moving signal storage medium in such manner as to cause the moveable signal-reproducing means to resume its normal position.

3. An apparatus for recording and reproducing a complex electrical signal in synchronism with the exposure and later projection of a motion-picture film comprising means for recording on a moving signal storage medium a complex electrical signal comprising a motion-picture program together with a first timing signal to which the motion of the film being exposed is synchronized, moveable signal-reproducing means for reproducing the recorded complex electrical signal and the said first timing signal, means for separating said reproduced signals, means for generating a control signal of magnitude proportional to a function of the phase difference between the reproduced first timing signal and a second timing signal, means responsive to said control signal for positioning said moveable signal-reproducing means to maintain a minimum phase-difference between the said reproduced first timing signal and the said second timing signal, means responsive to a positioning other than normal of the moveable signal-reproducing means for adjusting the average speed of the moving signal-storage medium in such manner as to cause the moveable signal-reproducing means to resume its normal position, and means for synchronizing the motion of the film during projection with the frequency of the said second timing signal.

4. The apparatus of claim 3 wherein a motion-picture camera is synchronized to the first timing signal and wherein a motion-picture projector is synchronized to the second timing signal.

5. The apparatus of claim 3 wherein the moving signal-storage medium comprises a magnetizable tape or wire.

6. The apparatus of claim 3 wherein the moveable signal-reproducing means comprises a lightweight magnetic reproduce-head capable of motion substantially parallel to the direction of travel of the moving signal-storage medium.

7. The apparatus of claim 3 wherein the control signal of magnitude proportional to a function of the phase-difference between the reproduced first timing signal and the second timing signal is derived from the output of a modulator having applied to its input terminals the reproduced first timing signal and the second timing signal.

8. The apparatus of claim 3 wherein the means responsive to said control signal for positioning said moveable signal-reproducing means comprises a solenoid arranged to impart to the moveable signal-reproducing means a displacement from normal proportional to the magnitude of said control signal in a direction parallel to the direction of travel of the moving signal-storage medium.

9. The apparatus of claim 3 wherein the means responsive to a positioning other than normal of the moveable signal-reproducing means for adjusting the average speed of the moving signal-storage medium comprises a moveable contact spring affixed to the said moveable signal-reproducing means which makes contact with one of two fixed contact springs whenever the said moveable signal-reproducing means is positioned in other than its normal or center position, a motor whose direction of rotation is determined by which of the two said fixed contact springs makes contact with said moveable contact spring, and gears by means of which said motor rotates a rheostat for controlling the power delivered to the capstan motor which drives the said moving signal-storage medium.

EDWARD N. DINGLEY, Jr.

No references cited.